US006646854B2

(12) United States Patent  
Fowler et al.

(10) Patent No.: US 6,646,854 B2
(45) Date of Patent: Nov. 11, 2003

(54) LIGHTNING SUPPRESSION ATTENUATOR AND SYSTEM EMPLOYING SAME

(76) Inventors: William J. Fowler, 2162 Gulf Terminal Dr., Houston, TX (US) 77023; Benjamin P. Fowler, 2162 Gulf Terminal Dr., Houston, TX (US) 77025

(*) Notice: Subject to any disclaimer, the term of this patent is extended or adjusted under 35 U.S.C. 154(b) by 241 days.

(21) Appl. No.: 09/855,355

(22) Filed: May 15, 2001

(65) Prior Publication Data

US 2002/0171988 A1 Nov. 21, 2002

(51) Int. Cl.[7] .......................... H01H 47/00; H02H 1/00
(52) U.S. Cl. .......................... 361/220; 361/117; 174/2; 174/50.52
(58) Field of Search .................................. 361/117, 212, 361/216, 217, 220, 118; 336/90, 96; 174/1–3, 6, 7, 38, 50.52, 51.98, 99 R, 130, DIG. 14, DIG. 17, 32, 35 R, 35 CE

(56) References Cited

U.S. PATENT DOCUMENTS

| | | | | |
|---|---|---|---|---|
| 1,138,186 A | * | 5/1915 | Brach | 174/6 |
| 3,584,260 A | * | 6/1971 | Barbini | 361/117 |
| 4,180,698 A | * | 12/1979 | Carpenter, Jr. | 174/2 |
| 6,278,599 B1 | * | 8/2001 | Gasque, Jr. | 361/117 |

* cited by examiner

Primary Examiner—Ronald W. Leja
(74) Attorney, Agent, or Firm—Harrison & Egbert

(57) ABSTRACT

A lightning suppression attenuator including an enclosure having an interior volume and a coil of conductive wire received within the interior volume of the enclosure. The coil has a first lead extending outwardly through a first opening of the enclosure and a second lead extending outwardly of a second opening in the enclosure. A conductive grit fills a portion of the enclosure. The coil has a central void with turns of wire extending around the central void. The first lead is connected to a first discharge grounding system. The second lead is connected to a second discharge grounding system. The rigid foam material is affixed within the enclosure around the conductive grit and over the coil.

18 Claims, 4 Drawing Sheets

LIGHTNING SUPPRESSION ATTENUATOR AND SYSTEM EMPLOYING SAME

TECHNICAL FIELD

The present relation relates to lightning suppression attenuators. More particularly, the present invention relates to devices for reducing the magnitude of current of the lightning current wavefront as it moves outwardly from a lightning strike. More particularly, the present invention relates to devices for protecting the electrical systems and critical load systems of facilities adjacent to a tower.

BACKGROUND OF THE INVENTION

Lightning conceivably may have provided humankind with a first source of fire, but lightning has otherwise been a destructive force throughout human history. Strategies and apparatus for reducing the likelihood of damage by lightning are fairly old, including, for instance, lightning rods that have been use for approximately 200 years. While the use of such rods and other precautionary steps and safety devices reduce the damage and injury that would otherwise result from lightning today, it remains an enormously dangerous natural phenomenon that claims hundreds of lives worldwide every year and destroys a substantial amount of property. Somewhat paradoxically, advances in other areas of technology have increased, rather than diminished, the damaged caused by lightning. This is because relatively low voltage and current levels can damage integrated circuits and other modem electronic components, with the result that many electronic devices are more susceptible to lightning damage today than ever before. Many devices to which microprocessors technology has been added are more susceptible to lightning damage as a result of such improvements. Additionally, lightning is capable of inducing substantial currents not only in electrical circuits directly struck by it but also in circuits located within the magnetic field induced by a nearby lightning strikes, giving each strike enormous destructive potential.

One of the most common areas of lightning strikes are large telecommunications and camera towers that extend upwardly from the earth. Typically, such towers include an electronic device at the top which serves to transmit or receive information. Since lightning will follow a path of least resistance on its way to the earth, the towers are very attractive to lightning. It is well known that lightning is particularly attracted to areas of positive ions and is repelled by areas of negative ions. Since the electronic devices at the top of towers often operate on AC power, an attractive source of positive ions is generated at the top of the tower.

Whenever lightning strikes a tower, an enormous amount of damage is created. Typically, the electronic device at the top of the tower is completely destroyed by the lightning. Furthermore, the structure of the tower and other associated electronics at the top of the tower can become damaged. Repair efforts on the tower are often time consuming and expensive. Typically, complete replacement of the electronic device at the top of the tower is required. As such, it is very important to develop a device which resists or prevents lightning strikes.

A major problem associated with such lightning strikes, even upon towers which employ extensive lightning suppression and grounding systems is that, when the lightning passes to the earth, a wavefront of current will pass outwardly from the tower through the earth. If this wavefront of lightning current through the earth is not suppressed, then it can be damaging to the facility adjacent to the tower or to the critical load systems within the facility. If the ground transference of lightning current should connect with the critical load system for the facility, then a great deal of damage can occur to the computer systems within the building. Similarly, if the lightning current wavefront should encounter the electrical system for the building, then damage can occur to items connected to the electrical system.

It is an object of the present invention to provide a lightning suppression attenuator that effectively prevents lightning strikes from affecting the building service connections and the critical load systems for facilities adjacent to the lightning strike.

It is another object of the present invention to provide a lightning suppression attenuator that effectively minimizes the magnitude of the lightning current as it moves radially outwardly from the lightning strike.

It is a further object of the present invention to provide a lightning suppression attenuator which will minimize the damaging effects of lightning.

It is a further object of the present invention to provide a lightning suppression attenuator which is easy to install, relatively inexpensive and easy to manufacture.

It is a further object of the present invention to provide a lightning suppression system which effectively employs an arrangement of grounding rods for minimizing lightning effects.

These and other objects and advantages of the present invention will become apparent from a reading of the attached specification and appended claims.

SUMMARY OF THE INVENTION

The present invention is a lightning suppression attenuator that comprises an enclosure with a coil of conductive wire received within the interior volume of the enclosure. The coil has a first lead extending outwardly of the enclosure and a second lead extending outwardly of the enclosure. A conductive grit fills the interior of the enclosure. The first lead is connected to a first discharge grounding system. The second lead is connected to a second discharge grounding system.

In the present invention, the conductive grit comprises a first layer of conductive grit residing across a bottom of the enclosure. The coil is positioned on the top of this first layer of conductive grit. A second layer of conductive grit extends over and around the coil within the enclosure. A rigid foam material is injected through holes formed on the walls of the enclosure so as to extend around the conductive grit and over the coil. The coil has a central void with turns of wire extending around the central void. In the preferred embodiment of the present invention, the wire is AWG#2 600 volt insulated copper wire. The coil, preferably, will have approximately fifteen turns of wire around the central void. The first lead is in liquid-tight sealing relationship with a first opening formed on the enclosure. The second lead is in liquid-tight sealing relationship with a second opening formed in the enclosure.

The present invention is also a lightning suppression system comprising a first grounding system installed in the earth, a first lightning suppression attenuator having a first lead electrically connected to the first grounding system, and a second grounding system installed in the earth. The lightning suppression attenuator has a second lead electrically connected to the second grounding system. The lightning suppression attenuator has a configuration described herein previously.

The first grounding system can be a tower that has a grounding rod extending into the earth. The second grounding system can be a building service electrical system having a grounding rod extending into the earth. The lightning suppression attenuator is interposed between the tower and the building service electrical system. A third grounding system is installed in the earth. A second lightning suppression attenuator has a first lead electrically connected to the second grounding system and a second lead electrically connected to the third grounding system. In the preferred embodiment of the present invention, the third grounding system can be a critical load system.

The first lightning suppression attenuator and the second lightning suppression attenuator each include a first grounding rod connected to the first lead and installed in the earth and a second grounding rod connected to the second lead and installed in the earth. The first grounding system includes a first grounding rod, a second grounding rod, and a third grounding rod electrically connected together in a geometrical pattern. Each of these grounding rods includes a central shaft and a plurality of vanes extending radially outwardly from the central shaft. The central shaft and the plurality of vanes are of a conductive material.

DETAILED DESCRIPTION OF THE INVENTION

Figure 1:
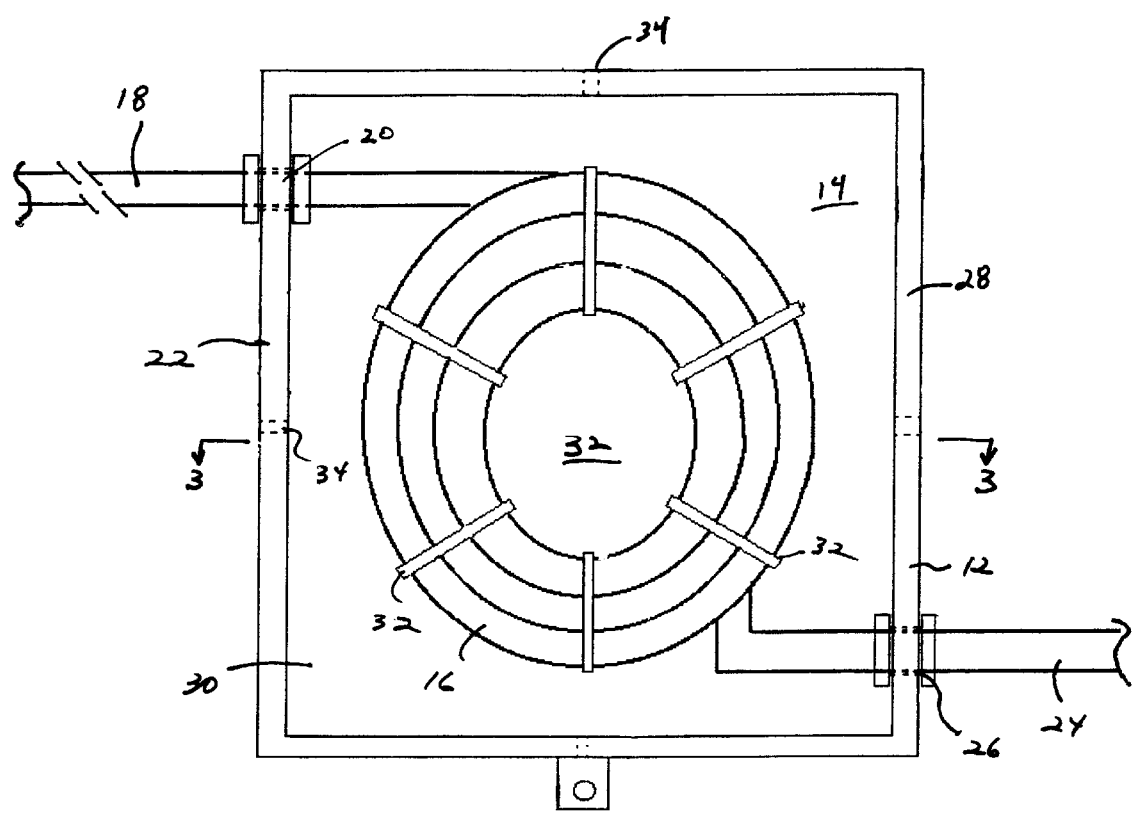
FIG. 1 is a plan view of the interior of the lightning suppression attenuator of the present invention.

Referring to FIG. 1, there is shown at 10 the lightning suppression attenuator in accordance with the teachings of the present invention. The lightning suppression attenuator 10 includes an enclosure 12 having an interior volume 14 and a coil 16 of conductive wire received within the interior volume 14 of the enclosure 12. The coil 16 has a first lead 18 extending outwardly of a first opening 20 in the wall 22 of the enclosure 12. The coil 16 has a second lead 24 extending outwardly of an opening 26 formed in another wall 28 of the enclosure 12.

As can be seen in FIG. 1, the enclosure 12 is a box formed of a polyvinyl chloride (PVC) material. In the preferred embodiment of the present invention, the enclosure 12 is eight inches wide by eight inches long and by four inches deep. As will be described hereinafter, a cover is positioned over the top surface of the enclosure 12. A conductive grit material 30 (shown with greater particularity in FIG. 3) resides on the bottom of the enclosure 12 within the interior volume 14. The coil 16 is located in the center of the enclosure 12 and upon the grit 30.

The coil 16 is, in the preferred embodiment of the present invention, a coil of AWG#2 superflex stranded 600 volt insulated wire. Coil 16 is formed of fifteen turns of the wire around a void 32 formed in the center of the coil 16. First lead 18 and second lead 24 are generally five foot leads extending outwardly of the enclosure 12. Cinch straps 32 serve to secure the coil 16 together around the central void 32. These cinch straps 32 are positioned at sixty degree arc intervals around the circumference of coil 16. The coil 16 is dipped in glyptal and dried for twenty-four hours.

After the coil 16 is installed upon the layer 30 of conductive grit, the remainder of the enclosure 12 is filled with another coarse steel grit to within one-half inch from the top of the enclosure 12. As can be seen in FIG. 1, holes 34 are formed in each of the walls of the enclosure 12. Holes 34 allow an expandable foam, such as polyurethane, to be injected into the interior volume 14 so as to extend around the conductive grit within the enclosure 12 and over and around the coil 16. As such, the interior volume 14 will be completely sealed.

Figure 2:
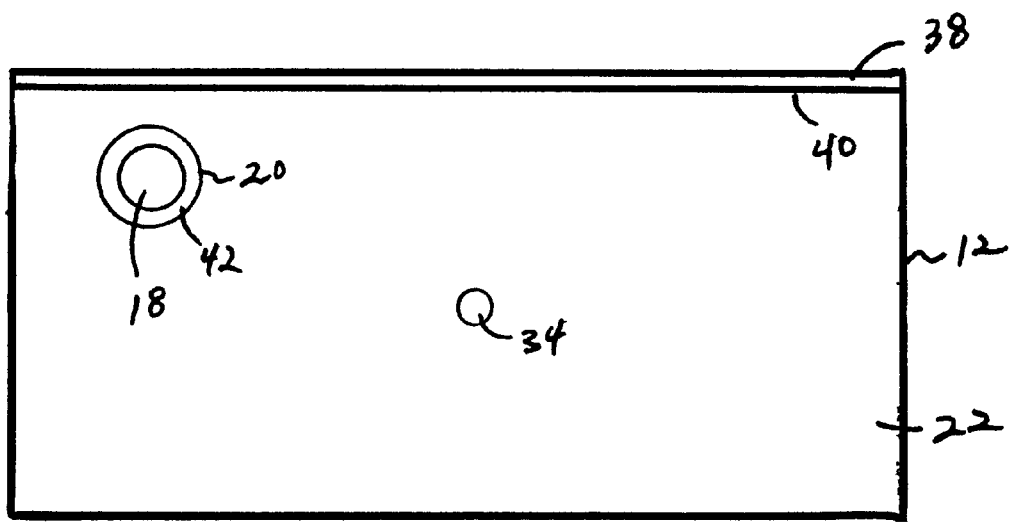
FIG. 2 is a side elevational view of the lightning suppression attenuator of the present invention.

FIG. 2 shows the exterior view of the enclosure 12 at side 22. As can be seen, a lid 38 is affixed onto the top opening 40 of the enclosure 12. In particular, the lid can be screwed onto the top 40 of the enclosure 12 so as to securely seal the interior volume 14. The hole 34 allows the expandable foam to be injected into the interior volume 14. Opening 20 is also formed on wall 22. The first lead 18 is illustrated as extending outwardly of the opening 20. Watertight connector 42 extends around the lead 18 within the hole 20 so as to provide a liquid-tight seal between the hole 20 and the lead 18. A similar arrangement of seal is provided in association with opening 26 formed on wall 28 of the enclosure 12.

Figure 3:
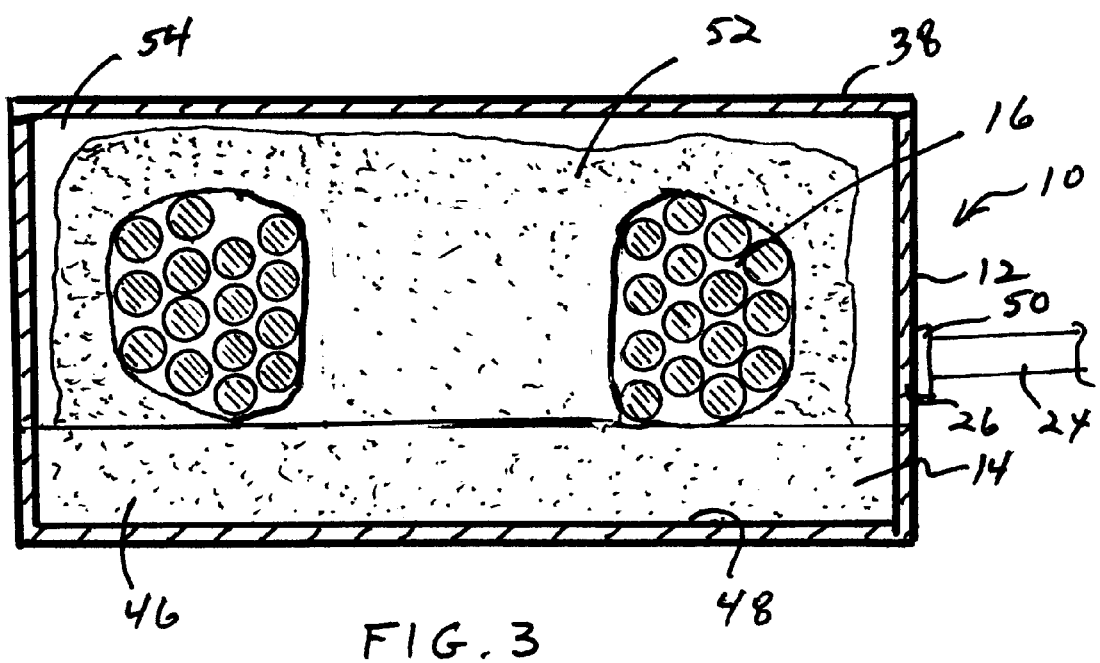
FIG. 3 is a cross-sectional view taken across lines 3—3 of FIG. 1 showing the interior of the lightning suppression attenuator of the present invention.

Referring to FIG. 3, the interior configuration of the lightning suppression attenuator 10 is particularly shown. The enclosure 12 has lid 38 affixed thereover. The interior volume 14 includes a first layer 46 of coarse steel grit residing upon the bottom 48 of the enclosure 12. The coil 16 is then placed upon the top of the layer 46. The second lead 24 of the coil 16 extends outwardly through opening 26. Seal 50 surrounds the exterior of the lead 24 so as to provide a liquid-tight seal with the second opening 26.

Another layer 52 of coarse steel grit is then placed upon the first layer 46 and over and around the coil 16. The expandable foam material 54 will extend around the grit 52 and around the coil 16 so as to fully seal the coil 16 within the interior volume 14 of enclosure 12.

Figure 4:
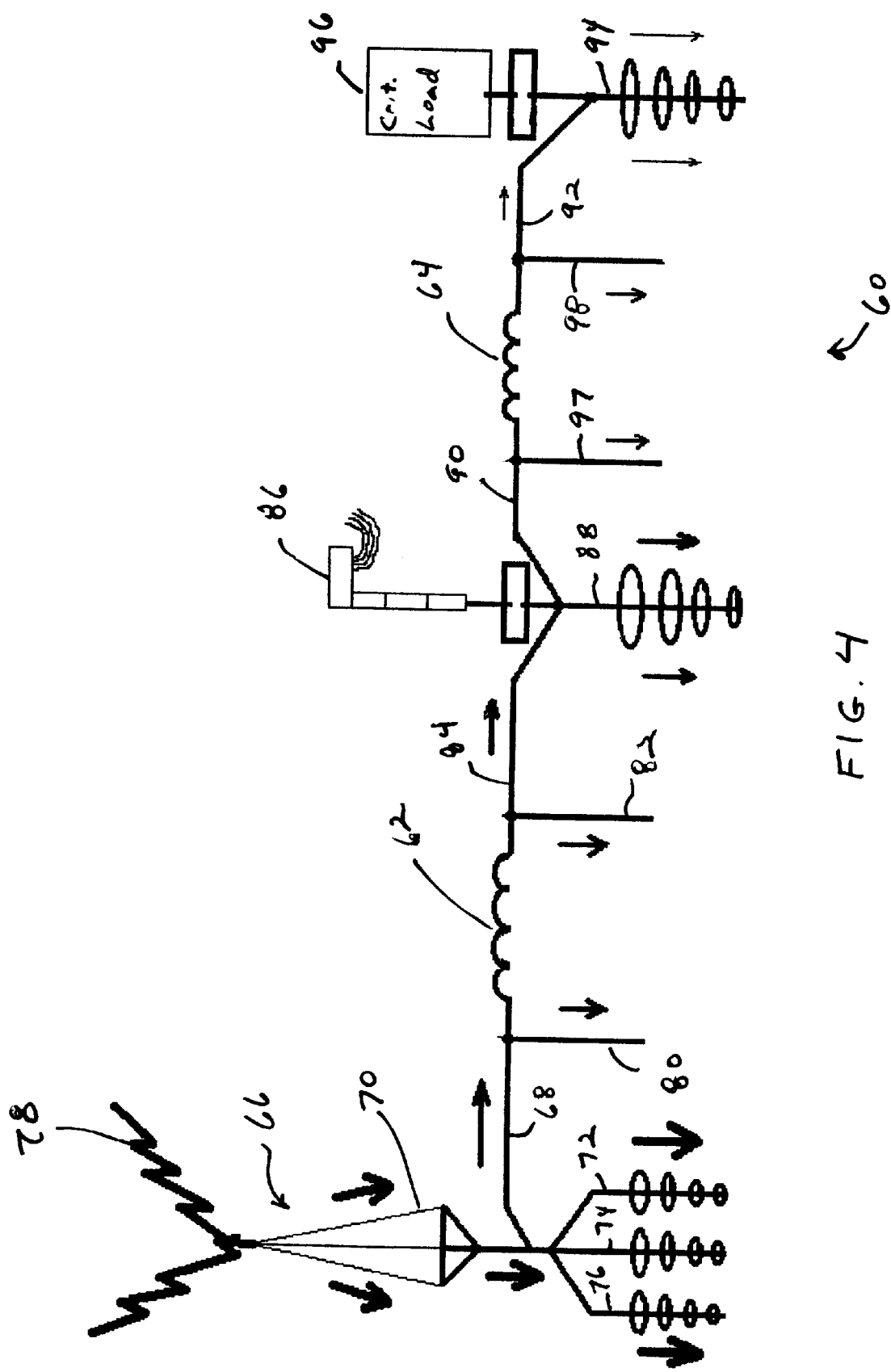
FIG. 4 is a diagrammatic illustration of the lightning suppression system employing the lightning suppression attenuator of the present invention.

FIG. 4 shows the system 60 employing the lightning suppression attenuators 62 and 64. The lightning suppression attenuators are of the configuration of lightning suppression attenuator 10, as illustrated in FIGS. 1–3 hereinbefore.

Figure 6:
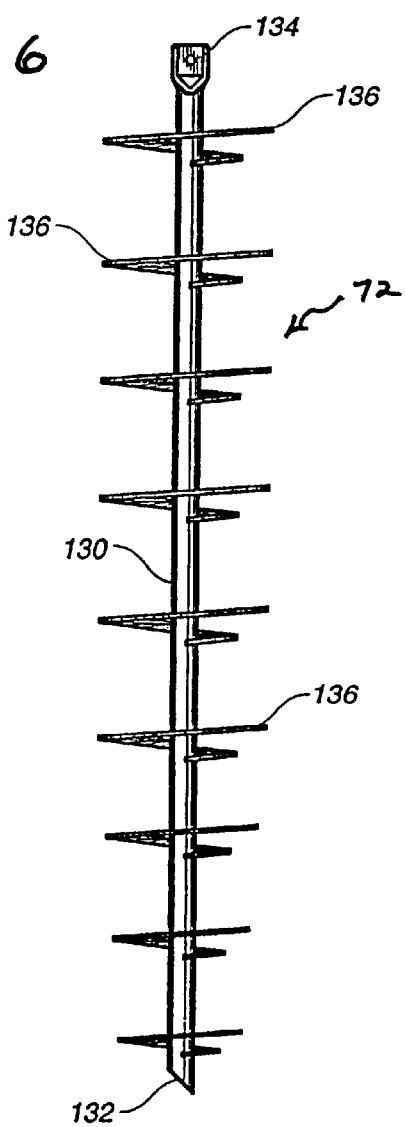
FIG. 6 is a side elevational view showing the grounding rod as used in the present invention.

Initially, in FIG. 4, it can be seen that a first grounding system 66 is electrically connected along lead 68 to the first lightning suppression attenuator 62. The first grounding system 66 includes a tower 70 which extends upwardly from the earth. A plurality of grounding rods 72, 74 and 76 are electrically connected to the tower 60. Each of the grounding rods 72, 74 and 76 has a peculiar configuration (as illustrated in FIG. 6). The grounding rods 72, 74 and 76 are embedded in the earth in a geometrical pattern. Each of the grounding rods 72, 74 and 76 are electrically connected together. In FIG. 4, it can be seen that a lightning strike 78 is illustrated as contacting the tower 60. The grounding system formed by the grounding rods 72, 74 and 76 will cause a great deal of the lightning current wavefront to be discharged into the earth. The lead 68 will draw some of the current (that would otherwise have been discharged in the earth) toward the first lightning suppression attenuator 62. Grounding rods 80 and 82 are embedded in the earth on opposite sides of the lightning suppression attenuator 62. The grounding rod 80 is connected to the first lead 68 associated with the first lightning suppression attenuator 62. The second grounding rod 82 is connected to the second lead 84 of the first lightning suppression attenuator 62. The arrows in FIG. 4 are intended to indicate the relative decrease in magnitude as the lightning current wavefront moves from left to right. The grounding rods 80 and 82 can be of a conventional shaft-like configuration.

The first lightning suppression attenuator 62 will greatly reduce the magnitude of the lightning current wavefront as it approaches the second grounding system 86. The second grounding system 86 can be a building service grounding system. A grounding rod 88 is connected to the second grounding system 86. The grounding rod 88 is electrically connected to the second lead 84 of the first lightning suppression attenuator 62. The grounding rod 88 is suitably embedded in the earth. The grounding rod 88 will have a similar configuration to that of the grounding rods 72, 74 and 76 associated with the first grounding system 66 (as illustrated in FIG. 6).

The second lightning suppression attenuator 66 has a first lead 90 electrically connected to the grounding rod 88 associated with the building service grounding system 86. The second lightning suppression attenuator 64 has a second lead 92 electrically connected to the grounding rod 94 associated with the critical load grounding system 96. The first lead 90 is also connected to a conventional grounding rod 97 on one side of the lightning suppression attenuator 64. The second lead 92 is also connected to another grounding rod 98. The grounding rods 97 and 98 will further serve to assure that a portion of the lightning current wavefront is discharged into the earth. The grounding rod 94 is of the same particular configuration as previously described grounding rods 72, 74, 76 and 88. The third grounding system (identified hereinbefore as the "critical load grounding system") serves to further discharge the lightning current wavefront into the earth and preventing the lightning current wavefront from damaging the critical load system.

It should be noted within the concept of the present invention that the various arrangements of the first grounding system 78, the second grounding system 86 and the third grounding system 96 can be made within the concept of the present invention. For example, the first lead 90 of the second lightning suppression attenuator 64 could be connected to the first grounding system 66. Alternatively, the building service grounding system 86 could be connected to the second lightning suppression attenuator 64 while the critical load grounding system 96 is connected to the first lightning suppression attenuator 62.

Figure 5:
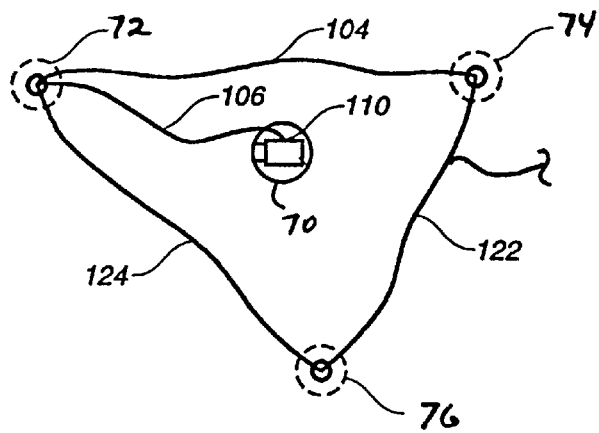
FIG. 5 is a plan view showing the configuration of grounding rods associated with the tower.

FIG. 5 shows how the tower 70 is positioned around the geometric pattern of grounding rods 72, 74 and 76. In particular, electrical line 106 will extend from the grounding rod 72 to the base 110 of tower 70. Electrical line 104 serves to connect the grounding rod 72 with the grounding rod 74. Another electrical line 122 connects the grounding rod 74 with the grounding rod 76. An electrical line 124 will connect the grounding rod 76 with the grounding rod 72. As such, the grounding rods 72, 74 and 76 form a geometric pattern around the tower 70.

FIG. 6 illustrates, in detail, the particular configuration of grounding rod 72 as used in the present invention. This particular configuration is also used for grounding rods 74, 76, 88 and 94 in the present invention. It can be seen that the grounding rod 72 has a central shaft 130 that extends from the pointed base 132 to the connection point 134. A plurality of spiral-shaped vanes 136 are positioned in spaced relationship longitudinally along the length of the shaft 130. Each of the spiral-shaped vanes 136 creates the "digging" action of the grounding rod 72. By rotating the grounding rod 72, the vanes 136 will engage the earth so as to draw the grounding rod 72 into the earth. The connection point 134 can be connected to a suitable rotational mechanism. After removal from the rotational mechanism, the connection point 134 can be used as the contact point for the electrical lines 104 or 106. As can be seen, the great surface area along each of the vanes 136 and along the shaft 130 establishes strong electrical connections between the grounding rod 72 and the earth. A carbon electrolyte can be placed over the surfaces of the grounding rod 72 so as to further establish a strong electrical connection.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

We claim:

1. A lightning suppression attenuator comprising:
   an enclosure having an interior volume, said enclosure having a first opening and a second opening;
   a coil of conductive wire received within said interior volume of said enclosure, said coil having a first lead extending outwardly of said first opening and a second lead extending outwardly of said second opening; and
   a conductive grit filling a portion of said enclosure.

2. The attenuator of claim 1, said conductive grit comprising:
   a first layer of conductive grit residing across a bottom of said enclosure, said coil positioned on a top of said first layer of conductive grit; and
   a second layer of conductive grit extending over and around said coil within said enclosure.

3. The attenuator of claim 1, further comprising:
   a rigid foam material affixed within said enclosure around said conductive grit and over said coil.

4. The attenuator of claim 3, said enclosure having a plurality of holes formed on walls thereof, said holes adapted to allow said rigid foam to be injected into said enclosure.

5. The attenuator of claim 1, said coil having a central void with turns of wire extending around said central void.

6. The attenuator of claim 5, said wire being AWG#2 600 volt insulated copper wire, said coil having approximately fifteen turns of wire around said central void.

7. The attenuator of claim 1, said first lead being connected to a first discharge grounding system, said second lead connected to a second discharge grounding system.

8. The attenuator of claim 1, said first lead being in liquid-tight sealing relationship with said first opening, said second lead being in liquid-tight sealing relationship with said second opening.

9. A lightning suppression system comprising:
   a first grounding system installed in the earth;
   a first lightning suppression attenuator having a first lead electrically connected to said first grounding system, said first lightning suppression attenuator comprising a coil of conductive wire received within an enclosure;
   a second grounding system installed in the earth, said first lightning suppression attenuator having a second lead electrically connected to said second grounding system;
   a conductive grit filling a portion of said enclosure.

10. The system of claim 9, said conductive grit comprising:
   a first layer of conductive grit residing across a bottom of said enclosure, said coil positioned on a top of said first layer of conductive grit; and
   a second layer of conductive grit extending over and around said coil within said enclosure.

11. The system of claim 9, said first lightning suppression attenuator further comprising:
   a rigid foam material fixed within said enclosure around said conductive grit and over said coil.

12. The system of claim 9, said coil having a central void with turns of wire extending around said central void.

13. The system of claim 9, said first grounding system being a tower having a grounding rod extending into the earth, said second grounding system being a building service electrical system having a grounding rod extending into the earth.

14. The system of claim 13, further comprising:
   a third grounding system installed in the earth; and
   a second lightning suppression attenuator having a first lead electrically connected to said second grounding system and a second lead electrically connected to said third grounding system.

15. The system of claim 9, said first lightning suppression attenuator further comprising:
   a first grounding rod connected to said first lead, said first grounding rod installed in the earth; and
   a second grounding rod connected to said second lead, said second grounding rod installed in the earth.

16. The system of claim 9, said first grounding system comprising:
   a first grounding rod;
   a second grounding rod electrically connected to said first grounding rod; and
   a third grounding rod electrically connected to said first and second grounding rods, said first, second and third grounding rods arranged in a geometrical pattern.

17. The system of claim 16, each of said first grounding rod, said second grounding rod and said third grounding rod comprising:
   a central shaft; and
   a plurality of vanes extending radially outwardly from said central shaft, said central shaft and said plurality of vanes being of a conductive material.

18. The system of claim 9, said second grounding system having a grounding rod extending into the earth, said second lead connected to said grounding rod, said grounding rod comprising:
   a central shaft; and
   a plurality of vanes extending radially outwardly from said central shaft, said central shaft and said plurality of vanes being of a conductive material, each of said plurality of vanes having a spiral-shaped configuration.

* * * * *